United States Patent [19]

Cohen et al.

[11] 3,970,630

[45] July 20, 1976

[54] 2,4-QUINAZOLINE DIONE-POLYAMIDE-ESTER RESINS

[75] Inventors: Choua Cohen, Grenoble; Durif Durif Varambon, Eybens; Robert Salle; Bernard Sillion, both of Grenoble, all of France

[73] Assignee: Institut Francais du Petrole, es Carburants et Lubrifiants et Entreprise de Recherches et d'Activities Petroliers Elf, Rueil-Malmaison, France

[22] Filed: Mar. 18, 1974

[21] Appl. No.: 452,258

[30] Foreign Application Priority Data

Mar. 21, 1973   France .............................. 73.10225

[52] U.S. Cl. ........................... 260/30.2; 260/33.4 P; 260/33.6 R; 260/33.6 UB; 260/47 CP; 260/49; 260/63 N; 260/75 N; 260/75 TN; 260/75 NM; 260/77.5 R; 260/841; 260/843; 260/850; 260/857 R; 428/423; 428/458

[51] Int. Cl.² .................. C08G 63/68; C08G 69/44; C08G 73/06

[58] Field of Search......... 260/47 CP, 75 N, 77.5 R, 260/49, 843, 850, 857, 63 N, 75 NM, 75 TN; 428/423, 458

[56] References Cited

UNITED STATES PATENTS

| | | | |
|---|---|---|---|
| 3,390,131 | 6/1968 | Roeser................................. | 260/75 |
| 3,424,728 | 1/1969 | Nakanishi et al.................. | 260/77.5 |
| 3,632,837 | 1/1972 | Kolyer et al. .................... | 260/857 R |
| 3,635,892 | 1/1972 | Rabilloud et al. .............. | 260/47 CP |
| 3,674,741 | 7/1972 | Shunichiro et al.............. | 260/47 CP |
| 3,817,943 | 6/1974 | Lee et al. ......................... | 260/78 TF |

*Primary Examiner*—Lester L. Lee
*Attorney, Agent, or Firm*—Millen, Raptes & White

[57] ABSTRACT

New polyamide-ester resins, their manufacture and the new compositions manufactured therefrom, the latter being useful for enameling metal conductors. The enameled conductors are stable at relatively high temperatures.

The resins are manufactured from a polycarboxylic component, a part of which is a 2,4-quinazoline dione dicarboxylic compound, a polyamine component and a polyhydroxy component.

24 Claims, No Drawings

2,4-QUINAZOLINE DIONE-POLYAMIDE-ESTER RESINS

The invention concerns new polymeric compounds whose chain contains 2,4-quinazoline-dione heterocycles associated with amide and ester chains. It also concerns the processes of manufacture of these polymers, the resinous mixtures containing these compositions and the solid coatings obtained with these compositions, particularly on electric metal conductors.

Compositions of the polyester-imide type have already been proposed as enameling varnishes for electric conductors. Among others, the French Pat. Nos. 1,368,741, 1,478,938, 1,511,961 and 2,009,052 describe the use of varnishes for electric metal wires, of condensation products prepared from acid materials containing cyclic imide groups or from condensation products in which, during condensation, imide rings are formed.

Polymers of the polyester-quinazaline-dione type, such as described in the Belgian Pat. No. 788,807, have also been proposed for enameling electric conductors.

Some of these compositions result in coatings, the physical, chemical and thermal properties of which are close to the properties required of an isolating coating for electric conductor.

The supply of quinazoline dione heterocycles substantially improves the varnish with respect to the prior art, particularly as far as resistance to abrasion is concerned.

This invention has for object to manufacture, under economic conditions, an isolating varnish of further improved properties by introducing amide groups into the formula.

Finally, the invention concerns a polyamide-ester-quinazolinedione resin soluble in cresylic acid and cresols, this resin being essentially obtained from a polycarboxylic component, an amine component comprising a primary aromatic diamine and a polyhydroxy component.

The 2,4-quinazoline dione polyamide-ester resin of the invention is so constituted that is polycarboxylic component consists, in a proportion of 5–100 % and preferably 8–40 %, calculated as carboxylic acid equivalent, of at least one dicarboxylic acid containing 1 or 2 2,4-quinazoline dione rings of one of the general formulae:

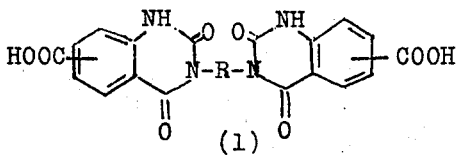

(1)

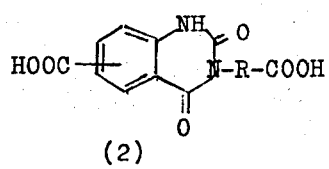

(2)

in which R is a divalent aliphatic, alicyclic or preferably aromatic radical containing, for example, 5–20 carbon atoms; and, in a proportion of 0–95 % and preferably 60–92 %, calculated as carboxylic acid equivalent, of at least one aromatic polycarboxylic acid, with the exception of those having 2 carboxy groups in "ortho" or "peri" position.

The amine component of the resin consists, in a proportion of 70–100 %, calculated as amine equivalents, of a primary aromatic diamine, and, in a proportion of 0–30 %, calculated as amine equivalents, of a primary aliphatic diamine, melamine or piperazine.

The polyhydroxy component of the resin consists, in a proportion of 50–100 % of the hydroxy equivalents, of at least one polyol containing at least 3 hydroxy groups and, in a proportion of 0–50 % of the hydroxy equivalents, of at least on aliphatic or cycloaliphatic diol containing, for example, 2–10 carbon atoms.

Among the dicarboxylic acids of the formulae (1) and (2), we prefer those in which R is an aromatic radical which may include one single aromatic ring, several joint aromatic rings or several simple or condensed aromatic rings linked by a direct bond, a divalent atom or a divalent group such as, for example, —O—, —S—, —SO—, —SO$_2$— or —CH$_2$—. Particularly preferred examples of such dicarboxylic acids are those in which R is a phenylene (for example 1,3-phenylene or 1,4-phenylene) or tolylene radical, or a divalent radical from diphenylmethane or diphenylether.

Examples of aromatic dicarboxylic acids are: isophthalic, terephthalic and 4,4'-diphenylether dicarboxylic, the preferred acid being terephthalic acid.

The "polycarboxylic component" may also comprise, in a proportion of at most 10 % of the carboxylic acid equivalents, at least one aliphatic dicarboxylic acid containing, for example 4–10 carbon atoms, such as maleic, adipic, azelaic and sebacic.

The primary aromatic diamines which may be used according to the invention are of the formula H$_2$N—Ar'—NH$_2$ in which Ar' is a divalent aromatic radical consisting of one aromatic ring or several aromatic rings, either joined or linked by direct bonds, divalent atoms such as —O— or —S— or divalent hydrocarbon groups, for example alkylene, or containing heteroatoms, such as oxygen, nitrogen, sulfur, slicon or phosphorus. The radical Ar' may also consist of one of the above radicals in which the aromatic rings have substituents, for example hydrocarbon groups or halogens. The preferred Ar' groups for these diamines are those which have at least two rings having each 6 carbon atoms and comprise a benzenic unsaturation in each ring. Such groups Ar' are, for example:

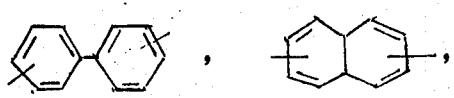

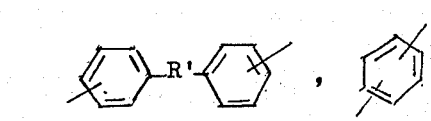

and 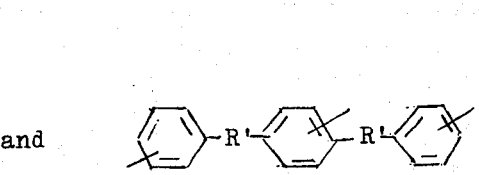

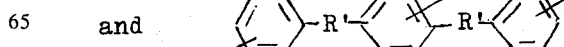

in which R' is oxygen, sulfur or a group such as:

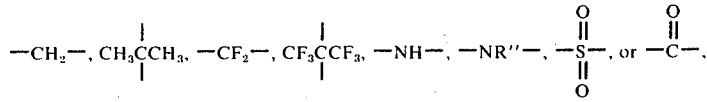

in which R'' is an alkyl radical of 1–6 carbon atoms or an aryl radical having up to 12 carbon atoms. Among the diamines to be used in the invention are: 2,2-bis-(4-aminophenyl)-propane, 4,4'-diamino-diphenylmethane, 4,4'-diamino-diphenylamine, benzidine, 4,4'-diamino-diphenyl-sulfide, 4,4'-diamino-diphenyl-sulfone, 3,3'-diamino-diphenylsulfone, 4,4'-diamino-diphenyl-ether, bis-(4-aminophenyl)phenylphosphine-oxide, bis-(4-aminophenyl)-N-methylamine, 1,5-diamino-naphthalene, 3,3'-dimethyl-4,4'-diamino-biphenyl, 3,3'-dimethoxy-benzidine, 1,4-bis (p-aminophenoxy)benzene and the mixtures of these compounds. The preferred amines are 4,4'-diamino diphenyl methane and 4,4'-diamino diphenyl ether.

The primary aliphatic diamines which can be used in the invention are of the general formula $H_2N-R'''$—$NH_2$, where $R'''$ is a divalent aliphatic group, either straight or not, comprising 3–20 carbon atoms.

Examples of polyols containing at least 3 hydroxy groups are the aliphatic triols, for example glycerol, 1,1,1-trimethylolethane or 1,1,1-trimethylol propane, aliphatic tetrols, such as pentaerythritol, aliphatic hexols, such as sorbitol or mannitol, or heterocyclic triols such as tris (hydroxyethyl) isocyanurate or tris(hydroxypropyl) isocyanurate, the preferred polyol being tris (hydroxyethyl) isocyanurate which will be hereinafter named THEIC.

As examples of aliphatic or cycloaliphatic diols, we can name: ethyleneglycol, 1,4-butanediol, 1,5-pentanediolneopentylglycol, 1,6-hexanediol, trimethyl-1,6-hexanediol or 1,4-cyclohexanediol, the preferred diol being ethyleneglycol.

For manufacturing the polyamide-ester-quinazoline dione resins of the invention, we react together, while using conventional techniques, a group of polycarboxylic compounds comprising:

in a proportion of 5–100 % and preferably 8–40 % of the engaged carboxylic groups, at least one of the dicarboxylic acids of the formulae (1) and (2) above and/or at least one lower alkyl ester of such dicarboxylic acids, in a proportion of 0–95 % and preferably 60–92 % of the engaged carboxylic groups, at least one of the hereinbefore defined aromatic polycarboxylic acids and/or at least one of their lower alkyl esters, with a group of diamines which comprises:

in a proportion of 70–100 % of the supplied amine equivalents, at least one primary aromatic diamine, selected for example from those hereinbefore mentioned, and, in a proportion of 0–30 % of the supplied amine equivalents, at least one primary aliphatic diamine and/or melamine or piperazine;

and with a group of polyols which comprises:

in a proportion of 50–100 % of the engaged hydroxy equivalents, at least one polyol having at least 3 hydroxy groups and selected, for example, among those hereinbefore mentioned, and in a proportion of 0–50 % of the engaged hydroxy equivalents, at least one aliphatic or cycloaliphatic diol selected, for example, for those mentioned above.

In the above description, "lower alkyl" means an alkyl radical of 1–6 carbon atoms. The methyl ester is used very often.

Among the dicarboxylic compounds having 2,4-quinazoline dione rings to be used in the manufacture of the polyester resins of the invention, particularly interesting specific compounds are:

2,4-tolylene-bis [3-(7-methoxycarbonyl-2,4-quinazolinedione) -yl ] of the formula:

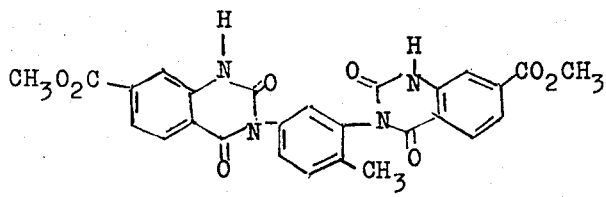

4,4'-methylene-biphenylene-bis [3-(7-methoxycarbonyl-2,4-quinazolinedione)-yl] of the formula:

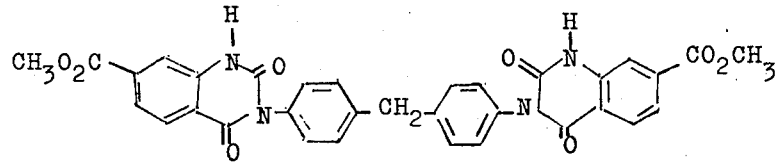

4,4'-oxy-biphenylene- bis [3-(7-methoxycarbonyl-2,4-quinazolinedione-)-yl] of the formula:

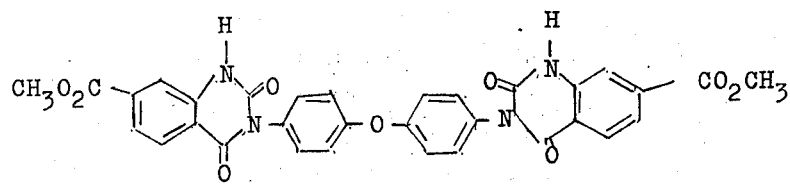

or 3(p.methoxycarbonyl phenyl)-7-methoxycarbonyl-2,4-quinazolinedione, of the formula:

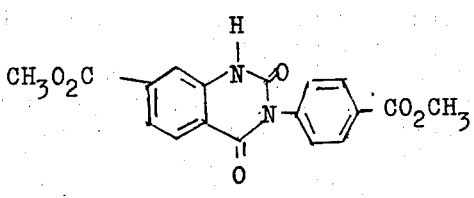

It is essential, for obtaining resins of good quality, that the reactants be introduced in proportions such that the ratio of the sum of the amine equivalents and the hydroxy equivalents to the sum of the carboxylic equivalents be higher than 1, preferably in the range of from 1.1 to 2. Further the reactants must be engaged in proportions such that the ratio of the sum of the amine equivalents to the sum of the carboxylic equivalents be in the range of from 0.1 to 0.4.

The condensation reaction is advantageously carried out at temperatures of from 150° to 240°C (preferably 190°–240°C) and in the presence of an esterification or transesterification catalyst preferably consisting of a tetra-alkyl titanate whose alkyl groups have 1–6 carbon atoms. The reactants are preferably dissolved in a solvent of boiling point preferably higher than 190°C, such as N-methyl pyrrolidone, cresylic acid, m-cresol or a cresol mixture; the amount of solvent is usually low, a dry material content of 60–90 % by weight being used very often. The reaction time depends on the reactants, their proportions, the catalyst, the solvent and the temperature; by way of example, when operating at 190°–240°C, the heating time is usually 6–20 hours. We prefer, during the reaction time, to let the volatile compounds formed by esterification or transesterification and aminolysis (water or alcohols) escape from the reaction mixture. They are recoverable and the determination of their amount is useful for determining the reaction progress.

The resins of the invention may be manufactured in one step but it is also possible and, as a rule, more advantageous to work in two steps, first by reacting the polyhydroxy compounds with the polycarboxylic compounds, and then by reacting the amine compounds with the polyesters resulting from the first step.

The dicarboxylic acids containing quinazoline-dione rings of the formulae (1) and (2) and their esters have been described in the French Pat. No. 2,152,454.

This patent also describes processes for manufacturing these products, essentially comprising reacting an aromatic amino dicarboxylic compound of the formula:

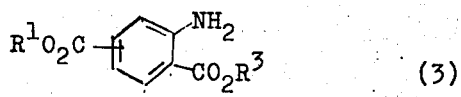

in which $R^1$ and $R^3$ are each a hydrocarbon radical, either with a di-isocyanate of the formula OC-N—R—NCO in which R is defined as above, or with an isocyanate linked to a carboxy group of the formula OCN—R—CO$_2$R$^2$ in which $R^2$ is a hydrocarbon radical containing, for example, 1–10 carbon atoms, this reaction being simultaneous or followed with a cyclization reaction resulting in the formation of the 2,4-quinazoline dione ring (s).

This reaction may also yield intermediary uncyclized compounds of the ureide type which comply with the general formula:

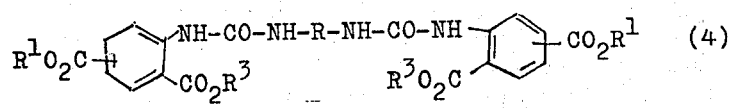

or with the general formula:

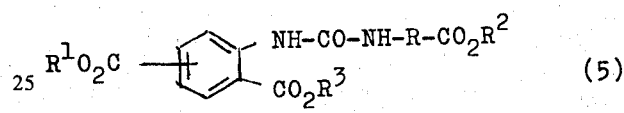

where R, $R^1$, $R^2$ and $R^3$ are as hereinbefore defined.

In order to be used for preparing polyamide-ester-2,4-quinazoline dione resins of the invention, the dicarboxylic compounds containing quinazoline dione rings, when prepared according to the hereinbefore stated method, may be isolated from the reaction medium in which they have been formed.

Their isolation may be avoided and we then add directly to the raw product of the manufacture of said dicarboxylic compounds the other reactants necessary to the manufacture of the polyamide-ester-2,4-quinazoline dione resins of the invention.

The polyamide-ester-2,4-quinazoline dione resins of the invention are useful, for example for manufacturing coatings, such as varnishes for enameling electric metal conductors.

According to the above methods of preparation, the polyamide-ester-quinazoline dione resins of the invention are usually obtained in the form of solutions in a solvent or in a mixture of solvents, such as hereinbefore stated.

These solutions constitute base varnishes for manufacturing coating compositions, such as enameling varnishes for electric metal conductors. These basic varnishes may be diluted by addition of one of the above solvents, or by admixing several of them. We can also dilute them with aliphatic or aromatic hydrocarbons, or with aromatic hydrocarbon cuts of boiling point preferably higher than 100°C, which are particularly well adapted to this use.

In order to improve the possibilities of use of these base varnishes, particularly for preparing coating compositions for electric metal conductors, it is possible to add various materials which are usually employed for reacting with them, either at room temperature or by heating, for example, at 90°–180°C for 1–4 hours.

Thus an alkyl titanate may be added to the base varnish, such as hereinbefore defined, for example in a proportion of 0.1–10 % by weight of the dry material of the varnish.

A polyisocyanate may also be added to the varnish, for example in a proportion of 1–15 % by weight, for example polyisocyanate such as a "blocked" tri-isocyanate resulting from the trimerization of 2,4-tolylene di-isocyanate, such as those sold under the trade marks "Mondur S", "Desmodur CTS" and "Mondur SH", inter alia, or a polyisocyanate such as sold under the trade mark "Desmodur APS" prepared from trimethylolpropane, tolylene di-isocyanate and phenol, or a di-isocyanate of the diaryl-alkane type, for example 4,4-diphenylmethane di-isocyanate, or a polyisocyanato-aryl-alcane of functionality higher than 2.

We may also add, for example in a proportion of from 0.1 to 1 % by weight, a metal drier, for example a metal octoate or naphthenate.

It may be advantageous to incorporate to the varnish, for example in a proportion of 1–15 % by weight, a phenolaldehyde resin, for example a phenol-formaldehyde resin, a cresol formaldehyde resin or a melamine-formaldehyde resin.

Biphenyl, when added, for example, in a proportion of 0.5–2.5 % by weight, may in some cases improve the surface state of the coatings obtained with the varnishes.

The above proportions are given as the ratio of the additive weight to the dry content by weight of the varnish.

Any conventional technique may be used for enameling electric metal conductors with these varnishes.

In the following examples, we have enameled a cylindrical copper wire of a 0.8 mm diameter in a vertical oven; after 6 impregnations, the diameter of the enameled wire is 0.86–0.88 mm.

The properties of the enameled conductors may be determined as follows:

their pliability is determined by subjecting them to a preliminary lengthening, then winding them around their own diameter (Mandrel 1 X test). The maximal lengthening tolerated by the wire before successfully passing the winding test — without breakage of the enamel layer— expresses the pliability of the enamel. It is given in %;

the thermal stability of the enamel is evaluated at 250°C according to the standard A.I.E.E. No. 57.

The following examples illustrate the invention but are not considered as limiting the scope thereof; in these examples the following abbreviations have been used:

T.H.E.I.C. : tris-(2-hydroxyethyl) isocyanurate
M.B.Q. : bis [3-(7-methoxycarbonyl-2,4-quinazolinedione) -yl]4,4'-methylenebiphenylene.
O.B.Q. : bis [3-(7-methoxycarbonyl-2,4-quinazolinedione) - yl]4,4'-oxybiphenylene.

EXAMPLE 1

144.8 g of MBQ, 535 g of methyl terephthalate, 441.3 g of THEIC, 102.2 g of ethyleneglycol, 59.4 g of 4,4'-diamino diphenylmethane, 156 g of meta cresol and 5 g of isopropyl titanate are introduced into a reactor provided with a powerful mechanical stirrer, an inert gas inlet, a vapor release pipe and a thermometer, in the absence of air.

This mixture is stirred and heated at 200°C for 2 hours, then maintained at 220°C for 3 hours; during said heating, 185 g of distilled methanol is collected. The viscous mixture is then diluted with 1500 g of m.cresol and, when the temperature has been lowered to 130°C, with 580 g of "Solvesso 100". After homogeneization and filtration through paper, we obtain a clear solution of light brown colour, whose content of dry material is 31.2 % and whose viscosity is 700 cst, as determined at 30°C. This mother-solution is divided into two parts of 1000 g each.

30 g of "Desmodur CTS" and 3 g of isopropyl titanate are added to 1000 g of this solution, and the mixture is maintained at 120°C for 1 hour. We use this solution for enameling a copper wire and obtain an enameled wire of smooth and homogeneous appearance. Its pliability is 18% and its life time at 250°C is higher than 1000 hours. Its plasticity temperature is higher than 400°C and its abrasion resistance is quite good.

12 g of 4,4'-diphenyl methane di-isocyanate and 6 g of isopropyl titanate are added to a second fraction of 1000 g of the mother-solution. We homogeneize the solution by heating at 120°C for 1.5 hour and we use it to enamel a copper wire. The enameled wire has a pliability of 20 % and a life of more than 1000 hours at 250°C.

EXAMPLE 2

548.4 g of MBQ, 99 g of 4,4'-diamino diphenyl methane, 793.5 g of methyl terephthalate, 740 g of THEIC, 170 g of ethyleneglycol, 315 g of m.cresol and 9 g of butyl titanate are admixed in an air-free environment in the same apparatus as described in example 1. The mixture is stirred for 5 hours at 200°C and 1 hour at 220°C. 2,820 g of cresol are then added and, when the temperature has decreased to 140°C, 1,100 g of "Solvesso 100". The varnish solution, which contains 29.5 % of dry material, has a viscosity of 1000 cst at 30°C. 150 g of "Desmodur APS", 20 g of isopropyl titanate and 190 g of phenol-formaldehyde resin are added to this solution at 120°C. The resulting solution is used for enameling a copper wire; the so obtained enameled wire is of good quality, it is pliable (17 %) and its life is 930 hours at 250°C.

EXAMPLE 3

By using the same type of apparatus as described in example 1, we introduce into the reactor: 109.6 g of MBQ, 19.8 of 4,4'-diamino diphenyl methane, 158 g of methyl terephthalate, 157 g of THEIC, 31 g of ethylene glycol, 64 g of m.cresol and 2 g of isopropyl titanate. This mixture is strongly stirred while being heated up to 200°C in 30 mn; it is maintained at this temperature for 6 hours and heated for 3 hours at 220°C.

It is diluted at 200°C with 580 g of cresol, and then at 150°C with 210 g of "Solvesso 100". The resulting solution has a viscosity of 1800 cst at 30°C and a content of dry material of 32.1 %. Before use for enameling, we add 20 g of "Desmodur CTS" and 4 g of isopropyl titanate and the mixture is stirred at 120°C for 1 hour.

The enameled wire obtained with the latter solution has a bright, smooth and homogeneous apperance. Its pliability is 15 % and its life longer than 1000 h at 250°C.

EXAMPLE 4

167.2 g of methyl amino-terephthalate, 100 g of 4,4'-diphenylmethane di-isocyanate and 265 g of m.cresol are charged under inert atmosphere into a four-pipe reactor provided with a stirrer, an inert gas inlet, a thermometer and a short distillation column; the mixture is stirred at 200°C for 3 hours. 892 g of methyl terephthalate, 99 g of 4,4'diamino diphenylmethane, 740 g of THEIC, 170 g of ehtylene glycol and 8.3 g of isopropyl titanate are then added to the mixture, and the heating at 200°–210°C is continued for 6 hours. The polymer is diluted by addition at 200°C of 2500 g of cresol and then, at 140°C, of 935 g of "Solvesso 100". After filtration through paper, we obtain a dark yellow solution of varnish containing 31.7 % of dry matter and whose viscosity at 30°C is 690 cst.

68 g of 4,4'-diphenylmethane di-isocyanate and 16 g of butyl titanate are added to the solution which is then heated at 120°C for 1 and used for enameling a metal wire. We obtain a homegenous enameled wire which is heatresistant (its life at 250°C is longer than 900 h) and pliable (20 % of lengthening).

EXAMPLE 5

In the same apparatus as in example 4, we heat for 3 hours at 200°C a mixture of 113.5 g of 4,4'-diphenylmethane di-isocyanate, 190 g of methyl amino-terephthalate, 397 g of methyl terephthalate and 160 g of m.cresol. Methyl terephthalate, a material inert with respect to the reactants, when present during the phase of formation of the quinazoline-dione diester, gives a better homogeneity to the reaction mixture. 370 g of THEIC, 50 g of 4,4'-diaminodiphenyl methane, 85 g of ethyleneglycol and 4 g of isopropyl titanate are subsequently added, and the mixture is heated for 6 hours at 200°C and then 1 hour at 220°C. 1400 g of cresol and then, at 150°C, 550 g of "Solvesso 100" are successively added for dilution.

The solution has a viscosity of 520 cst at 30°C and a content of dry material of 27.5%.

After addition of 100 g of "Desmodur APS" and 5 g of isopropyl titanate, an enameling varnish is obtained.

When enameled with this solution, a wire remains pliable (18 % of lengthening) and heat-resistant (thermoplasticity temperature >400°C; life longer than 1000 hours at 250°C).

EXAMPLE 6

Under the experimental conditions of example 5, a mixture of 38 g of methyl aminoterephthalate, 23 g of 4,4'-diphenyl-ether di-isocyanate, 79 g of methyl terephthalate and 31 g of cresol is heated for 2 hours at 200°C under inert atmosphere. We add thereafter 74 g of THEIC, 17 g of ethyleneglycol, 50 g of 4,4'-diamino diphenyl ether and 1 g of butyl titanate. After condensation at 200°–210°C for 6 hours, we dilute with 280 g of cresol and 109 g of "Solvesso". The varnish solution contains 30.5 % of dry material and has a viscosity of 880 cst at 30°C; when used for enameling, 10 g of raw 4,4'-diphenyl methane di-isocyanate and 2 g of isopropyl titanate are added thereto. We obtain an enameled wire whose pliability is higher than 20% and life longer than 1000 hours at 250°C.

EXAMPLE 7

We heat for 3 hours at 200°C, under an air-free atmosphere, a mixture of 22.7 g of 4,4'-diphenylmethane di-isocyanate, 37.9 g of methyl amino-terephthalate, 79.4 g of methyl terephthalate and 32 g of m.cresol.

After a 3 hour heating, 65.2 g of THEIC, 17 g of ethylene glycol, 20 g of 4,4'-diamino diphenyl methane and 1 g of isopropyl titanate are added to the mixture; the polycondensation is carried out by heating at 200°C for 8 hours.

260 g of cresol are added at 200°C and 140 g of "Solvesso 100" at 140°C for dilution, which yields a homogeneous solution whose content of dry material is 29.8 % and viscosity 735 cst at 30°C. Before enameling, 20 g of "Desmodur CTS", 2 g of isopropyl titanate and 10 g of phenol-formaldehyde resin are added to the solution. The enameled wires obtained by means of the resulting varnish are of good quality: pliability of 15 % and life of more than 900 hours at 250°C.

EXAMPLE 8

We have used the same reactor as in example 4.

We heat in an air-free environment 36 g of 4,4'-diphenylmethane di-isocyanate, 60.26 g of methyl amino terephthalate, 49.3 cc of "meta-para-cresol" of the trade, 1.8 g of butyl titanate and 127.4 g of methyl terephthalate.

We stir as from the melting and maintain at 240°C for 3 hours. We add to the mixture 118.45 g of THEIC and 27.3 g of ethylene glycol and we carry out the polycondensation for 4 hours at 200°C and 3 hours at 220°C. We add 180 cc of "meta-para-cresol" and 15.86 g of 4,4'-diamino diphenyl methane. The reaction is continued for 3 hours at 200°C and 1 hour at 220°C. We dilute with 262 cc of "meta-para-cresol" at 200°C and 195 cc of "Solvesso 100" at 140°C.

The resulting varnish solution has a dry content of 31.6 % and a viscosity of 727 cst at 30°C. 15 g of "Desmodur CTS" and 3 g of butyl titanate are added to the solution before enameling. The enameled wires are of good quality: pliability of 10 %, unidirectional abrasion of 1560, life longer than 1000 hours at 250°C, good resistance to freon.

EXAMPLE 9

In a reactor of the same type as in the above examples, we introduce 87 g of MBQ, 127.4 g of methyl terephthalate, 118.4 g of THEIC, 27.3 g of ethylene glycol, 1.8 g of butyl titanate and 49.3 cc of cresol.

After having heated at 200°C for 4 hours and at 220°C for 1.5 hour, we add 180 cc of cresol and 15,86 g of 4,4'-diamino diphenyl methane. The reaction is continued for 3 hours at 200°C, then 2 hours at 220°C; we dilute with 262 cc of cresol at 200°C and 195 cc of "Solvesso 100" at 140°C.

The varnish solution obtained has a dry content of 29.7 % and a viscosity of 918 cst at 30°C.

15 g of "Desmodur CTS" and 3 g of butyl titanate are added to the solution which is used for enameling a copper wire.

The resulting isolated wires have a pliability of 12.5 %, an unidirectional abrasion of 1490, a life longer than 1000 hours at 250°C and a good resistance to freon.

EXAMPLE 10

In a reactor of the same type as above, we introduce 28.5 g of 4,4'-diphenyl methane di-isocyanate, 47.65 g of methyl amino terephthalate, 147.48 g of methyl terephthalate and 1.8 g of butyl titanate.

We heat at 150°C and stir for 0.5 hour at this temperature. We add 46.5 cc of "meta-para-cresol" and heat up to 240°C for 4 hours; then we add: 114.08 g of THEIC and 36.23 g of ethylene glycol, and we continue the reaction at 200°C for 3 hours and at 220°C for 4 hours. We add 17,31 g of 4,4'-diamino diphenyl methane and 176,8 cc of "meta-para-creso". We heat for 3 hours at 200°C and then 1,5 hours at 220°C.

We dilute with 265 cc of "meta-para-cresol" at 200°C and 195.6 cc of "Solvesso 100" at 120°C. The resulting varnish solution has a dry content of 30.5 % and a viscosity of 831 cst at 30°C. 15 g of "Desmodur CTS" and 3 g of butyl titanate are added to the solution before use for enameling copper wires.

The isolated wires have a pliability of 15 %, an unidirectional abrasion of 1530, an outstanding resistance to freon and a life of more than 1000 hours at 250°C.

In the above examples, "Solvesso 100" is an aromatic cut mainly consisting of alkyl-substituted benzene and boiling in the range of from 158 to 171°C. "Desmodur CTS" is a trimer of tolylene di-isocyanate blocked with phenol; "Desmodur APS" is a polyisocyanate manufactured from trimethylol propane, tolylene diisocyanate and phenol. "Meta-para-cresol" is a commercial mixture mainly containing meta-cresol and para-cresol.

What we claim is:

1. A condensation polyamide-ester resin of a polycarboxylic component, a polyamine component and a polyhydroxy component, said resin being characterized in that:
said polycarboxylic component comprises a proportion of 5 to 100%, calculated as carboxylic equivalents, of at least one dicarboxylic compound containing one or two 2,4-quinazoline dione rings, and selected from the dicarboxylic acids of the general formulae:

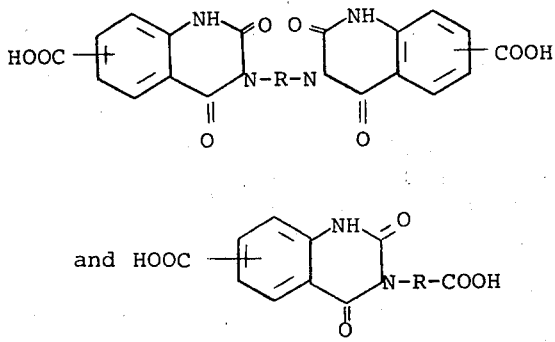

in which R is a divalent radical selected from the aliphatic, alicyclic and aromatic radicals and their lower alkyl esters, and a proportion of 0–95%, calculated as carboxylic acid equivalents, of at least one polycarboxylic compound selected from the aromatic polycarboxylic acids (other than aromatic polycarboxylic acids having 2 carboxylic groups in either the ortho or peri positions relative to each other) and their lower alkyl esters,
said polyamine component comprising a proportion of 70 to 100%, calculated as amine equivalents, of at least one aromatic primary diamine and a proportion of 0 to 30%, calculated as amine equivalents, of an amine selected from the aliphatic primary diamines, melamine and piperazine,
and said polyhydroxy component comprises a proportion of 50 to 100% of hydroxy equivalents of at least one polyol containing at least 3 hydroxy groups, and a proportion of 0 to 50%, as hydroxy equivalents, of at least one diol selected from the aliphatic and cycloaliphatic diols,
said polyamine component and said polyhydroxy component being used in proportions corresponding to a ratio of the sum of the amine and hydroxy groups to the sum of the carboxylic groups higher than 1 and a ratio of the sum of the amine groups to the sum of the carboxylic groups in the range of 0.1 –0.4.

2. A resin according to claim 1, wherein said polycarboxylic component has a 8-40 % content of carboxylic acid equivalents of at least one dicarboxylic acid containing one or two 2,4-quinazoline dione rings.

3. A resin according to claim 1, wherein R is an aromatic radical containing 5–20 carbon atoms.

4. A resin according to claim 3, wherein the radical R is selected from the phenylene and tolyene radicals and the divalent radicals formed by diphenylmethane and diphenylether.

5. A resin according to claim 1, wherein the aromatic polycarboxylic acid is therephthalic acid.

6. A resin according to claim 1, wherein the aromatic primary diamine is 4,4'-diamino diphenylmethane or 4,4'-diamino diphenylether.

7. A resin according to claim 1, wherein the aliphatic primary diamine contains 3–20 carbon atoms.

8. A resin according to claim 1, wherein the polyol containing at least 3 hydroxy groups is tris(hydroxyethyl) isocyanurate.

9. A resin according to claim 1, wherein the aliphatic diol is ethylene glycol.

10. A process for manufacturing a condensation polyamide-ester resin according to claim 1, comprising reacting at condensation temperature, in a solvent and in the presence of a condensation catalyst, a group of polycarboxylic compounds which comprises:
in a proportion of 5–100 % of the engaged carboxylic groups, at least one dicarboxylic compound selected from the dicarboxylic acids having 1 or 2 2,4-quinazoline dione rings, as defined in claim 1, and their lower alkyl esters,
in a proportion of 0–95 % of the engaged carboxylic groups, at least one compound selected from the aromatic polycarboxylic acids and their esters,
with a group of polyamines, which comprises:
in a proportion of 70–100 % of the supplied amine groups, at least one aromatic primary diamine,
and in a proportion of 0–30 % of the supplied amine groups, at least one diamine selected from the aliphatic primary diamines, melamine and piperazine,
and with a group of poly-hydroxy compounds which comprises:
in a proportion of 50–100 % of the supplied hydroxy groups, at least one polyol having at least 3 hydroxy groups,
and in a proportion of 0–50 % of the supplied hydroxy groups, at least on diol selected from the aliphatic and cycloaliphatic diols, said polycarboxylic compounds, said polyamines and said polyhydroxy compounds being supplied in proportions corresponding to a ratio of the sum of the amine and hydroxy groups to the sum of the carboxy groups higher than 1 and a ratio of the sum of the amine groups to the sum of the carboxy groups in the range of 0.1-0.4.

11. A process according to claim 10, wherin the polyhydroxy compounds are reacted with the polycarboxylic compounds in a first step, so as to form a polyester, and the diamines are reacted with said polyester in a second step.

12. A process according to claim 10 wherein the reaction temperature is 150°–240°C.

13. A resin according to claim 1, wherein:
said polycarboxylic component comprises 4,4'-methylenebiphenylene-bis[3-(7-methoxycarbonyl-2,4-quinazolinedione)-1] and methyl terephthalate;
said polyamine component comprises diamino-4,4'-diphenylmethane; and
said polydroxy component comprises tris(hydroxyethyl) isocyanurate and ethylene glycol.

14. A resin according to claim 1, wherein:
said polycarboxylic component comprises 4,4'-oxybisphenylene-bis[3-(7-methoxycarbonyl-2,4-quinazolinedione)-yl] and methyl terephthalate;
said polyamine component comprises diamino-4,4'-diphenyl ether; and
said polydroxy component comprises tris(hydroxyethyl) isocyanurate and ethylene glycol.

15. A process according to claim 12 wherein the reaction temperature is 190°–240°C.

16. A process according to claim 10, wherein said catalyst consists essentially of a tetra-alkyl titanate, the alkyl groups of which contain from 1 to 6 carbon atoms.

17. A process according to claim 10, wherein said solvent has a boiling point higher than 190°C.

18. A process according to claim 17, wherein said solvent is selected from the group consisting of N-methyl pyrrolidone, cresylic acid, m-cresol and a mixture of cresols.

19. A process according to claim 10, wherein said solvent is used in such an amount that the resin is obtained in the form of a solution having a content of dry material of 60–90 % by weight.

20. A composition which comprises at least one polyamide-ester resin according to claim 1, said resin being diluted in a solvent or a mixture of solvents.

21. A composition according to claim 20, which is further reacted with a proportion of 1–15% by weight of at least one polyisocyanate.

22. A composition according to claim 20 which further comprises a metal drier.

23. A metal wire enameled by means of a composition according to claim 20.

24. A mixed resin composition comprising a resin selected from the phenol-aldehyde resins and the melaminealdehyde, and at least one polyamide-ester resin of a polycarboxylic component, a polyamine component and a polyhydroxy component, said resin being characterized in that:
said polycarboxylic component comprises a proportion of 5 to 100%, calculated as carboxylic equivalents, of at least one dicarboxylic compound containing one or two 2,4-quinazoline dionce rings, and selected from the dicarboxylic acids of the general formulae:

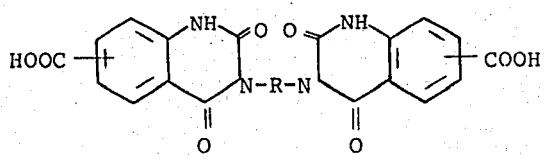

and 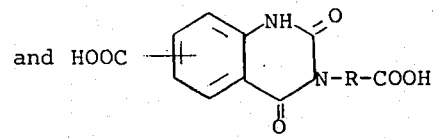

in which R is a divalent radical selected from the aliphatic, alicyclic and aromatic radicals and their lower alkyl esters, and a proportion of 0–95%, calculated as carboxylic acid equivalents, of at least one polycarboxylic compound selected from the aromatic polycarboxylic acids (other than aromatic polycarboxylic acids having 2 carboxylic groups in either the ortho or peri positions relative to each other) and their lower alkyl esters,
said polyamine component comprising a proportion of 70 to 100%, calculated as amine equivalents, of at least one aromatic primary diamine and a proportion of 0 to 30%, calculated as amine equivalents, of an amine selected from the aliphatic primary diamines; melamine and piperazine,
and said polyhydroxy component comprises a proportion of 50 to 100% of hydroxy equivalents of at least one polyol containing at least 3 hydroxy groups, and a proportion of 0 to 50%, as hydroxy equivalents, of at least one diol selected from the aliphatic and cycloaliphatic diols,
said polyamine component and said polyhydroxy component being used in proportions corresponding to a ratio of the sum of the amine and hydroxy groups to the sum of the carboxylic groups higher than 1 and a ratio of the sum of the amine groups to the sum of the carboxylic groups in the range 0.1–0.4, said resins being diluted in a solvent or a mixture of solvents.

* * * * *

UNITED STATES PATENT AND TRADEMARK OFFICE
CERTIFICATE OF CORRECTION

PATENT NO. : 3,970,630
DATED : July 20, 1976
INVENTOR(S) : Choua Cohen et al.

It is certified that error appears in the above-identified patent and that said Letters Patent are hereby corrected as shown below:

[73] Assignee:   show read --INSTITUT FRANCAIS DU PETROLE--.

Signed and Sealed this

First Day of February 1977

[SEAL]

*Attest:*

RUTH C. MASON
*Attesting Officer*

C. MARSHALL DANN
*Commissioner of Patents and Trademarks*